United States Patent [19]
Hammers

[11] Patent Number: 5,229,067
[45] Date of Patent: Jul. 20, 1993

[54] LIQUID METAL COOLED NUCLEAR REACTOR

[75] Inventor: Heinz-Wilhelm Hammers, Bergisch Gladbach, Fed. Rep. of Germany

[73] Assignee: Siemens Aktiengesellschaft, Munich, Fed. Rep. of Germany

[21] Appl. No.: 884,742

[22] Filed: May 15, 1992

[30] Foreign Application Priority Data

Nov. 17, 1989 [DE] Fed. Rep. of Germany ....... 3938345

[51] Int. Cl.$^5$ ............................................. G21C 13/08
[52] U.S. Cl. .................................... 376/294; 376/250; 376/406
[58] Field of Search ............... 376/294, 295, 296, 406, 376/292, 250, 205, 203, 293

[56] References Cited

U.S. PATENT DOCUMENTS

| | | | |
|---|---|---|---|
| 3,935,063 | 1/1976 | Dunckel | 376/298 |
| 3,963,563 | 6/1976 | Beine et al. | 376/287 |
| 4,032,397 | 6/1977 | Beine | 376/293 |
| 4,192,718 | 3/1980 | Janakiev | 376/294 |
| 4,508,677 | 4/1985 | Craig et al. | 376/294 |
| 4,650,642 | 3/1987 | Fluekler et al. | 376/293 |
| 4,767,593 | 8/1988 | Wedellsborg | 376/294 |
| 5,087,409 | 2/1992 | Wedellsborg et al. | 376/294 |

FOREIGN PATENT DOCUMENTS

| | | |
|---|---|---|
| 0118016 | 9/1984 | European Pat. Off. . |
| 0308691 | 3/1989 | European Pat. Off. . |
| 3115844 | 5/1984 | Fed. Rep. of Germany . |
| 1544693 | 11/1968 | France . |

*Primary Examiner*—Daniel D. Wasil
*Attorney, Agent, or Firm*—Herbert L. Lerner; Laurence A. Greenberg

[57] ABSTRACT

A liquid metal cooled nuclear reactor for a nuclear power plant on the modular principle is disposed in a reactor cavern having cooling surfaces. A reactor tank contains a reactor core and one or more heat exchangers and primary pumps and is surrounded by a double tank of nodular graphite cast iron serving as a heat accumulator and having a plurality of detachably interconnected and superposed rings and a base. With this configuration, not only is the structure simplified but advantages are also achieved for operation, inspection and repair or exchange. Producing the double tank from cast iron has appreciable advantages for the construction of the entire plant with respect to external influences. The function as a heat accumulator has appreciable advantages for the construction of the heat removal systems of the cooling surfaces.

4 Claims, 4 Drawing Sheets

LIQUID METAL COOLED NUCLEAR REACTOR

CROSS-REFERENCE TO RELATED APPLICATION

This application is a continuation of International Application Serial No. PCT/DE90/00880, filed Nov. 15, 1990.

The present invention relates to a liquid metal cooled nuclear reactor for a nuclear power plant on the modular principle in a reactor cavern fitted with cooling surfaces, having a reactor tank which contains a reactor core, one or more heat exchangers and primary pumps. Such a nuclear reactor is known from Published European Application No. 0 308 691 A1.

According to the modular principle, which has already been proposed in the case of other types of reactors, the overall output of a nuclear power plant is no longer to be achieved with a single large reactor but instead with a plurality of small reactors. In this way, in the event of failure, inspection or maintenance of a reactor, the nuclear power plant can continue to be operated with reduced output. In comparison with the liquid metal cooled nuclear power plants heretofore constructed or planned, having only one reactor with an individual output of 1000 MW or more, nuclear power plants which include a plurality of modular reactors having an individual output that in each case is about 200 MW do admittedly have some disadvantages with respect to fuel exploitation and breeding rate, but also have appreciable advantages for construction and operation. In the event of failure of all of the active systems, a modular reactor can give off its residual heat to the outside completely through its surface.

The applicant in German Patent DE 31 15 844 C2 has for the first time specified a sodium cooled nuclear reactor on the modular principle and presented the advantages of that principle. The configuration provided therein of the electro-magnetic pumps outside the reactor tank has appreciable advantages with respect to the installation, inspection and exchange of such pumps. However, it disturbs the unhindered residual heat removal from the reactor core through the tank wall to the outside if the normal heat removal through the secondary circuits to one or more steam circuits fails. However, the passive residual heat removal is a particular advantage of modular reactors and contributes considerably to the simple and inexpensive construction thereof. The reactor tank, which is filled with sodium, is disposed in the usual way in a second, inert-gas-containing so-called double tank, is supported at its lower end on a lower end ring and is guided at its upper end with a ring in a removable support ring, which rests on the upper edge of a reactor cavern of concrete. The double tank is intended to take up the liquid sodium in the event of damage occurring to the reactor tank.

In Published European Application No. 0 118 016 A1, once again the advantages of the modular principle in transport and installation are described in detail and numerous structural details are explained more fully. Disadvantages of that construction are the penetrations of the outer wall of the tank which are provided there and the configuration underneath the reactor tank of a central electromagnetic pump, which results in an appreciable increase in the overall height and causes appreciable additional effort in the inspection and exchange of such pumps because the coolant first has to be drained off. Another disadvantage is that, in the event of failure of the secondary coolant circuits, the residual heat has to be accumulated in the biological shield, that is to say first of all in the concrete outside a double tank of steel.

In U.S. Pat. No. 4,650,642, a nuclear reactor is described which is intended in particular to carry away the residual heat after a core meltdown, which in fact is extremely improbable, and to avoid damage to the environment. For that purpose, a thick shell of cast steel which is provided underneath the reactor tank is anchored in the ground and is intended to take up the reactor core melted through the reactor tank. The cylindrical side wall of the shell, which is provided as a double tank, is in contact either with a thermal insulation or with a cooling jacket, which is surrounded by a biological shield. Shells of such a type and size are very heavy and expensive and cannot be cast in one piece. They must therefore be welded together from more than one piece. An essential feature of that nuclear reactor is a water/steam cooling system underneath the reactor. The double tank and cavern are just one component. The double tank and cooling surfaces cannot be repaired from outside and it is scarcely possible to remove them.

The applicant in Published European Application No. 0 308 691 A1 has specified a further liquid metal cooled nuclear reactor on the modular principle which, in comparison with the nuclear reactors heretofore constructed or planned, not only simplifies the structure but also offers advantages for operation, inspection and repair or exchange. In principle, that reactor is intended to avoid the repeatedly discussed possibility of cracks in the tank or in the structure from spreading, to avoid the core from dropping, and as a result, to avoid the control rods that are suspended from the cover from being withdrawn from the core by having the main parts superposed and resting on the base of the reactor cavern. Consequently, all of the relative movements between reactor core and the control rods in the event of an earthquake are reduced or completely avoided, so that considerable expenditure for safety measures can be avoided. In the event of a failure of the secondary coolant circuits thereof, the reactor can completely give off its residual heat through the surface of its reactor tank and through its double tank to cooling surfaces in the reactor cavern, although they have to be correspondingly reliable due to their great significance in terms of safety. The reliability is achieved by multiple redundancy of the complete cooling system, by emergency power supply and/or by operation in natural circulation. Such measures entail extra costs.

It is accordingly an object of the invention to provide a removable liquid metal cooled nuclear reactor, which overcomes the hereinafore-mentioned disadvantages of the heretofore-known devices of this general type and in which the residual heat is initially accumulated and then given off to the surroundings.

With the foregoing and other objects in view there is provided, in accordance with the invention, in a modular nuclear power plant having a reactor cavern with cooling surfaces, a liquid metal cooled nuclear reactor in the reactor cavern, comprising a reactor tank, a reactor core inside the reactor tank, at least one heat exchanger and primary pump inside the reactor tank, and a double tank of cast iron surrounding the reactor tank and serving as a heat accumulator, the double tank including a plurality of detachably interconnected and superposed or stacked rings and a base.

In the base region, this double tank may also have approximately the same form as a double tank which was heretofore welded together from ferritic or austenitic steel sheets. However, it has a wall thickness which is eight to ten times greater, so that its heat capacity is adequate to accumulate the residual heat of the reactor for hours and to give it off to the cooling surfaces in the reactor cavern by radiation and convection. By virtue of the great accumulating effect, the subsequent cooling systems can start up slowly and they can even be switched off or repaired for a limited time. Consequently, the effort which was heretofore involved in making the cooling system immediately available can be considerably reduced, which results in a cost saving. This double tank can be removed with little effort for inspection or repair or for disposal.

In accordance with another feature of the invention, the double tank is formed of a nodular graphite cast iron, which is also referred to as spheroidal cast iron. This material, according to DIN 1693, is authorized in nuclear engineering for the production of transfer casks for fuel assemblies. It has already been demonstrated in the case of such transfer casks that they can withstand a drop from a considerable height and elevated temperatures even for a lengthy time. As a cast structure, this heat accumulator can be provided with ribs to improve the heat transfer, without any great effort. The extra costs which arise from the much greater weight of the cast double tank are compensated by the considerably lower price of the cast iron in comparison with the price of welded sheet-steel tanks. By virtue of its great wall thickness, the cast double tank has appreciable advantages with regard to external influences. The critical buckling pressure under external shock pressure and penetration protection are many times higher than in the case of a thin-walled steel tank, so that additional protective measures outside the double tank can be dispensed with or reduced.

In accordance with a further feature of the invention, the detachably interconnectable and superposable rings and the base are reinforced and can be screwed to one another by remote operation at their points of contact. In this way, the heavy double tank includes a plurality of parts which can each be individually produced, tested, transported and installed.

In accordance with a concomitant feature of the invention, in each case the rings and the base have two annular seals at their points of contact, and a test bore disposed between the seals, which leads to the outside. Consequently, the seals can be monitored from outside.

Other features which are considered as characteristic for the invention are set forth in the appended claims.

Although the invention is illustrated and described herein as embodied in a liquid metal cooled nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
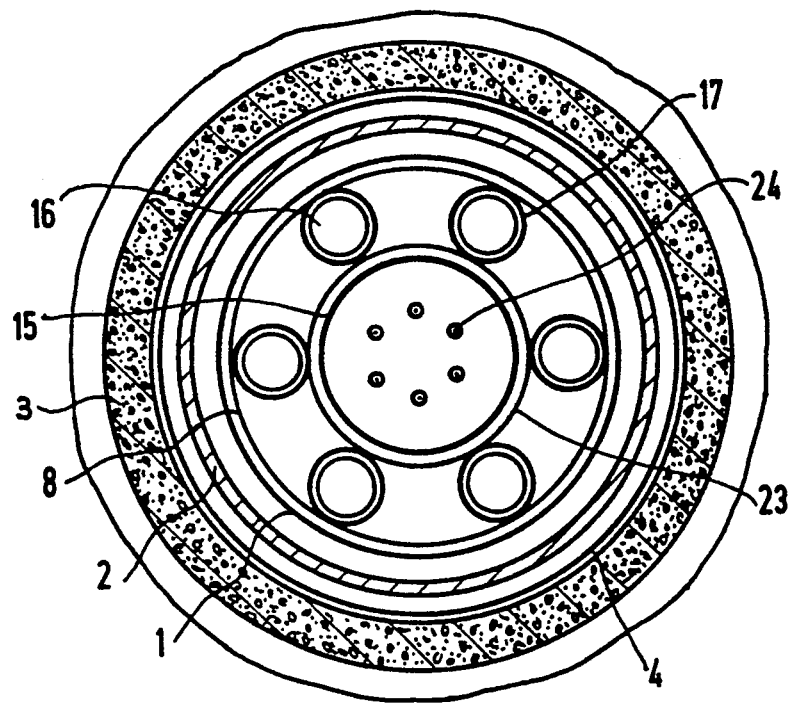
FIGS. 2 and 3 are fragmentary, cross-sectional views respectively taken along the lines I—I and II—II of FIG. 1, in the direction of the arrows.
Figure 3:
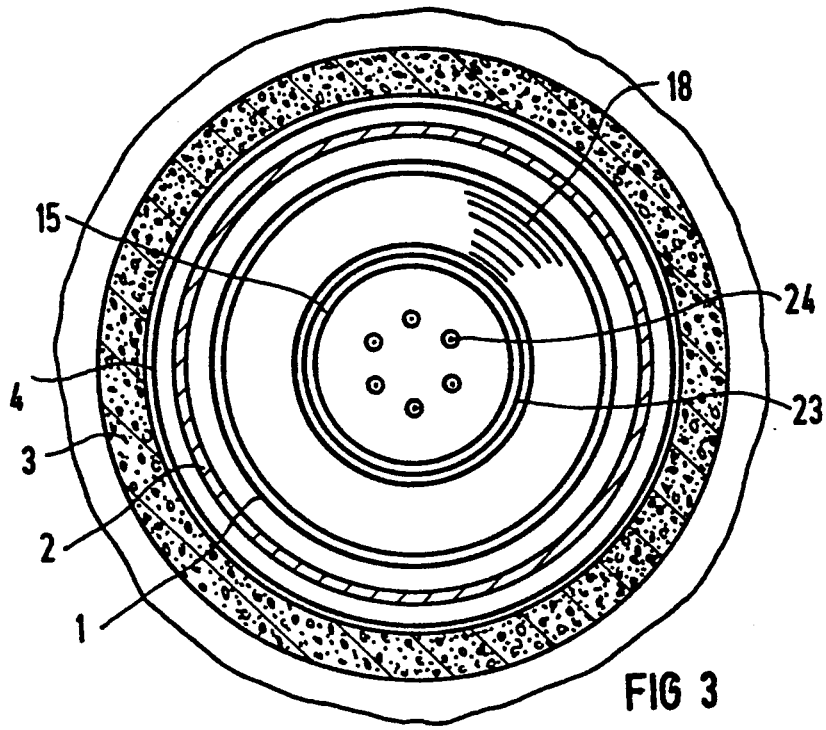
Figure 4:
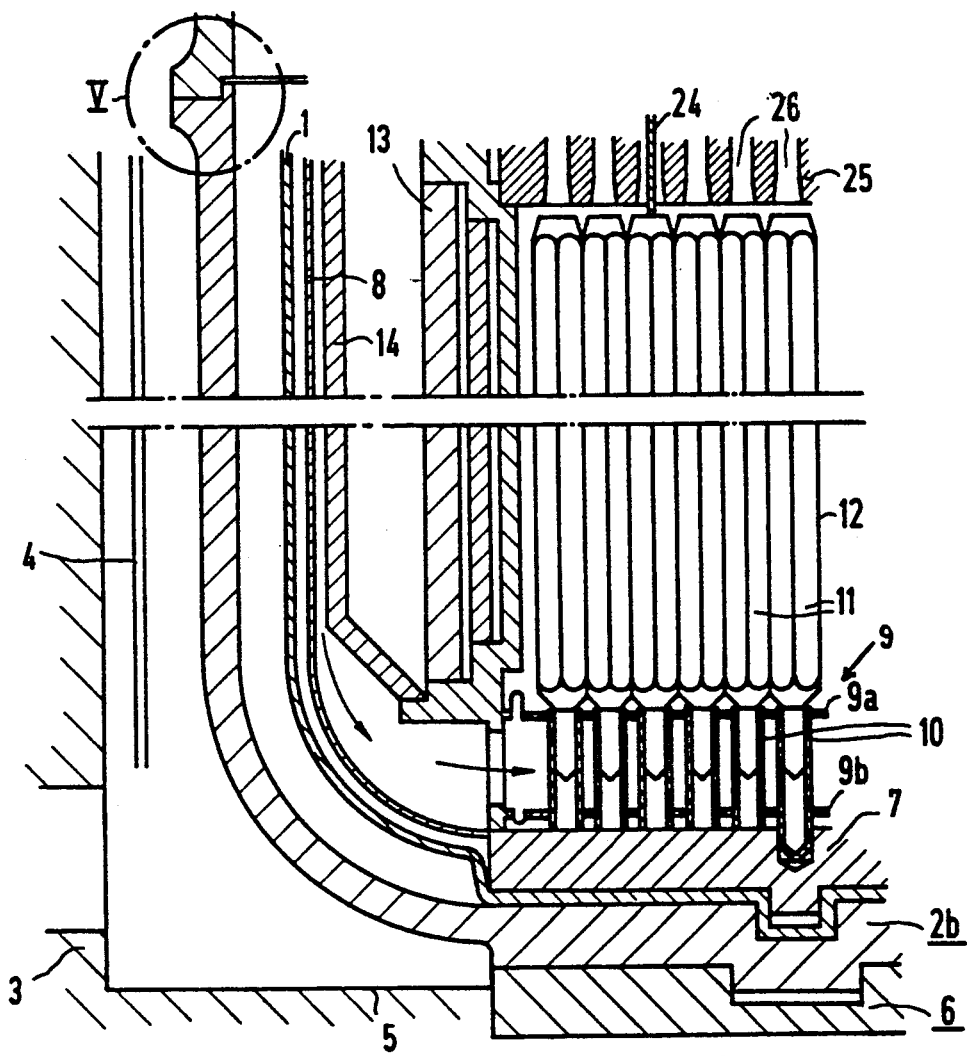
FIG. 4 is an enlarged view of the lower left-hand portion of FIG. 1.

Referring now in detail to FIGS. 1-4 of the drawing, there is seen a reactor tank 1 which is surrounded by a double tank 2 and stands in a reactor cavern 3, which has cooling surfaces 4 on the inner surface thereof. The double tank 2 includes a plurality of rings 2a and a base 2b. A supporting plate 7 is disposed on the double tank 2 and is connected at sides thereof to an outer conduit 8. A grid plate 9 is disposed on the supporting plate 7 and includes two perforated plates 9a and 9b which are connected by pipe nozzles 10. The pipe nozzles 10 transfer the weight of core assemblies 11 to the supporting plate 7. As is best seen in FIG. 4, a base 5 of the cavern 1 is constructed as a supporting platform 6 and bears the double tank 2, the reactor tank 1, the supporting plate 7, the grid plate 9 and the core assemblies 11, which are centered one on top of the other. Not shown in the drawings are sliding materials of a different metal which are disposed between planar bearing surfaces of the superposed parts, in order to permit different movements of neighboring parts at differing temperatures.

Figure 1:
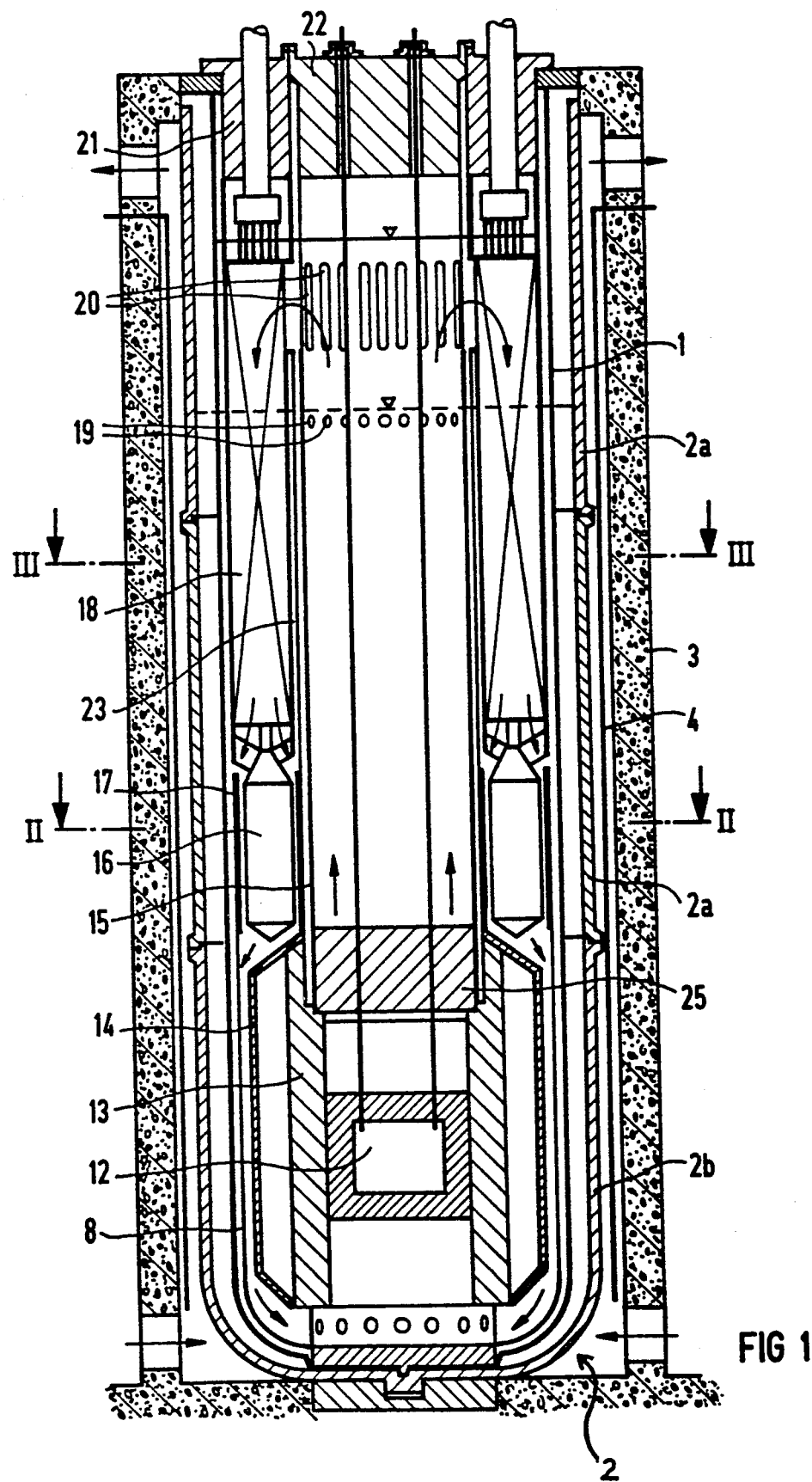
FIG. 1 is a fragmentary, diagrammatic, vertical longitudinal-sectional view of a nuclear reactor according to the invention, including its disposition in a cavern.

A reactor core 12, which is only diagrammatically shown in FIG. 1 but is shown in more detail in FIG. 4, is surrounded all around by a multipart metal shield 13, which in turn is surrounded by an inner conduit 14 and is lockably connected to a shaft 15 above the core. The conduit 14 is extended in the upward direction by a stack 23, which is initially surrounded by a plurality of electromagnetic pumps including an active part 16 and a passive part 17, and above them by a heat exchanger 18 as part of a non-illustrated secondary circuit. This secondary circuit transports reactor heat to a steam circuit for supplying steam turbo-generators. The heat exchanger 18 may be made up of a single annular tube bundle or of a plurality of parallel connected partial tube bundles. Not shown, but likewise possible, is also the use of mechanical pumps, having pump shafts being led between the partial tube bundles of the heat exchanger 18 upward to a drive motor through a ring cover 21. In an upper region, the shaft 15, the stack 23 and an inner jacket of the heat exchanger 18 have small holes 19, which are initially evenly distributed over the circumference. Above that, the shaft 15 has larger slits 20. Hot sodium rising from the reactor core 12 can flow to the heat exchanger 18 through the larger slits 20 as well as through the holes 19. The heat exchanger 18 is fastened together with the active part 16 of the electromagnetic pumps to the ring cover 21, which can be installed independently of the instrumentation cover 22, because the latter is supported by the shaft 15. As is seen in FIG. 4, the shaft 15 connects a shield 25 to the instrumentation cover 22 and contains both a linkage 24 for the automatic control and shutdown and leads for the instrumentation of the reactor core 12. The instrumentation cover 22 is sealed off from the ring cover 21 by inflatable seals in such a way as to permit an axial movement of the components against one another. The seals are not shown herein but are usual in the case of liquid metal cooled nuclear reactors. Disposed above the inflatable seals is a lifting and turning apparatus for the cover 22. The lifting and turning apparatus, which is required when changing core assemblies, is likewise known in the field of nuclear reactors and is therefore not shown herein.

FIG. 4 uses the same designations as in FIGS. 1 to 3 to show how the base 2b, the reactor tank 1, the supporting plate 7 and the grid plate 9 are superposed in a centered manner on the supporting platform 6 at the base 5 of the reactor cavern 3. In this case too, the sliding materials that were already mentioned above are not shown in detail. The reactor core 12, including the core assemblies 11, is first of all surrounded by the multipart metal shield 13, which in turn is surrounded by the conduit 14 that is also shielded. The shaft 15 and the additional axial shield 25 above the core assemblies 11 rest on the shield 13. This shield 25 has vertical clearances 26 for the passage of coolant, for receiving the linkage 24 and various core instrumentation means and for changing the core assemblies 11.

Figure 5:
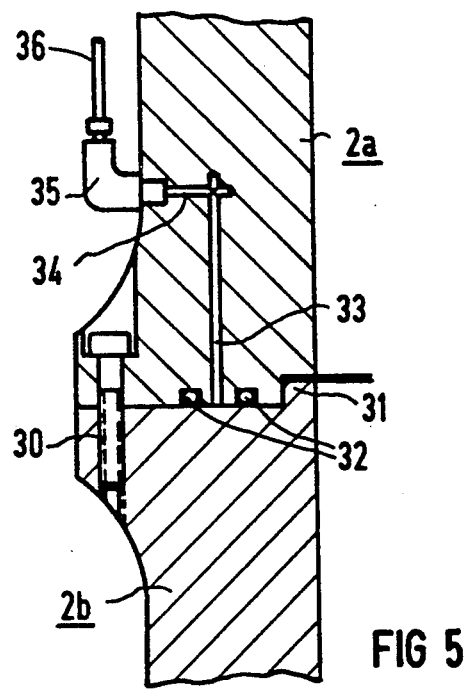
FIG. 5 is a further enlarged view of the portion V of FIG. 4.

FIG. 5 shows a reinforced point of contact between a ring 2a and the base 2b, which are held together by remotely operable bolts 30. Centering means 31 are provided on the inside. In the area of contact between the ring 2a and the base 2b there are two sealing rings 32, which may be metal O-rings, that are disposed in corresponding grooves. Between the sealing rings 32, a vertical test bore 33 leads to a horizontal bore 34 and then through an angle piece 35 to a test line 36, with which the seal can be monitored from the outside.

Figure 6:
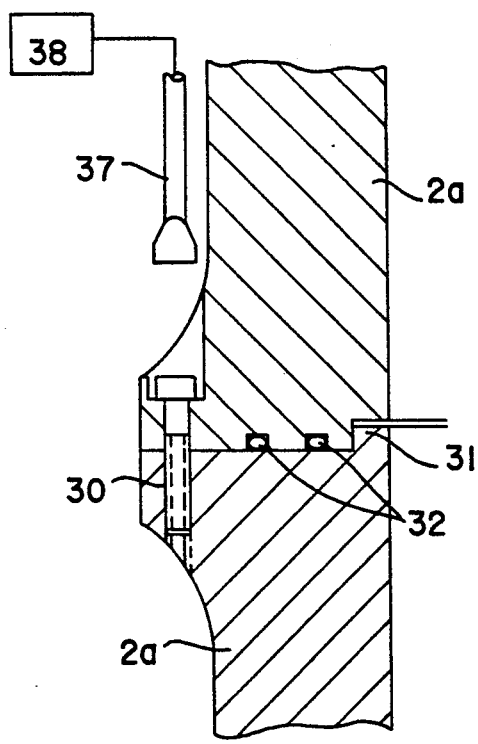
FIG. 6 is a view similar to that of FIG. 5, showing the connection of two rings.

As indicated in FIG. 6, a driver bit 37 for driving the bolt 30 is remotely advanced towards the bolt 30 by a remote control unit 38.

In the case of normal operation, the hot sodium flows out of the reactor core 12 upward through the shaft 15 and through the holes 19 or slits 20 to the heat exchanger 18, while giving off its heat to the outside by means of the non-illustrated secondary coolant circuit. The cooled sodium which is in a delivery gap of the electromagnetic pumps formed by the active part 16 and the passive part 17, is thereupon forced downward, where it is actually between an inner wall surface of the conduit 8 and an outer wall surface of the conduit 14, to the grid plate 9, from where it is conducted in the usual manner through slits in the pipe nozzles 10 into the lower end of the core assemblies 11, in order to take up their heat. In the event of a failure of the pumps, the sodium flows in the same way by natural circulation, while it likewise gives off its heat to the outside by means of the secondary coolant circuit. If the latter should fail, the heat is given off through the tank 1 and the double tank 2 to the cooling surfaces 4 or to a circulating gas in the reactor cavern 3. For example, the double tank 2, including a plurality of the rings 2a and the base 2b, may have a diameter of 5 m, a wall thickness of 150 mm and be formed of a spheroidal cast iron GGG according to DIN 1693. Considerable amounts of heat can be accumulated in this wall and given off to the cooling surfaces 4 with a time delay. In comparison with the usual heat accumulation in concrete, much higher temperatures can be allowed.

In order to change the core assemblies, a changing machine, which is known per se, is moved over the cover 22. The machine takes the spent core assemblies 11 directly out of the reactor core 12 and inserts fresh core assemblies. In order to do so, the already previously mentioned lifting and turning apparatus, which can be removed for the purposes of inspection or exchange, vertically raises the instrumentation cover 22 with shaft 15 and the shield 25 and turns it until an opening, which is not illustrated in the figures, is positioned over the core assembly to be changed. Subsequently, the desired core assembly is drawn into a flask and sealed off from the outside. If it becomes necessary to repair heat exchangers or pumps, a special component changing flask is moved over the ring cover 21. Through the use of the flask, the annular heat exchanger 18, with the active parts 16 of the electromagnetic pumps fastened thereto, can be exchanged, in a likewise inerted and sealed-off atmosphere. Changing flasks of this type are known and are usual for inspecting or exchanging heat exchangers and pumps in the case of liquid metal cooled nuclear power plants mentioned initially above. The dimensions of the modular reactor according to the invention, and in particular the relatively small diameter of about 5 m, allows the shaft 15 or the parts 7, 8, 9, 10, 13, 14, 17 and 23 surrounding the nuclear core, or even an entire reactor tank 1 and the individual rings 2a as well as the base 2b of the double tank, to also be exchanged in this way. According to the modular principle mentioned above, the other modular reactors of this same nuclear power plant are kept in operation during such repairs, as well as during the changing of core assemblies, so that a high availability of the nuclear power plant is ensured.

According to the repair concept described above, quick and inexpensive disposal, with minimum possible radiation exposure for the environment and personnel, at the end of the service life of a reactor, is also ensured.

I claim:

1. In a modular nuclear power plant having a reactor cavern with cooling surfaces, a liquid metal cooled nuclear reactor in the reactor cavern, comprising a reactor tank, a reactor core inside said reactor tank, at least one heat exchanger and primary pump inside said reactor tank, and a double tank of nodular graphite cast iron surrounding said reactor tank and serving as a heat accumulator, said double tank including a plurality of detachably interconnected and superposed rings and a base.

2. The nuclear reactor according to claim 1, wherein said rings to be interconnected and superposed and said base are reinforced at points of contact, and including means for screwing said rings and said base to one another by remote operation.

3. The nuclear reactor according to claim 1, wherein said rings and said base are interconnected to one another at respective points of contact, and including a plurality of annular seals, wherein two annular seals are disposed at each of said points of contact, and including a test bore leading to the outside between said seals.

4. In a modular nuclear power plant having a reactor cavern, a liquid metal cooled nuclear reactor in said reactor cavern, comprising a reactor tank, a reactor core inside said reactor tank, and a double tank of nodular graphite cast iron surrounding said reactor tank and serving as a heat accumulator.

* * * * *